United States Patent
Mayer et al.

(10) Patent No.: US 9,105,913 B2
(45) Date of Patent: Aug. 11, 2015

(54) DEVICE AND METHOD FOR PERFORMING A BIOLOGICALLY CATALYZED ELECTROCHEMICAL REACTION

(75) Inventors: Mateo Jozef Jaques Mayer, Leeuwarden (NL); Cees Jan Nico Buisman, Leeuwarden (NL); Hubertus Victor Marie Hamelers, Leeuwarden (NL); David Petrus Bonefatius Theodorus Bernardus Strik, Leeuwarden (NL)

(73) Assignee: Stichting Wetsus Centre of Excellence for Sustainable Water Technology, Leeuwarden (NL)

( * ) Notice: Subject to any disclaimer, the term of this patent is extended or adjusted under 35 U.S.C. 154(b) by 1170 days.

(21) Appl. No.: 12/736,619

(22) PCT Filed: Apr. 23, 2009

(86) PCT No.: PCT/NL2009/050218
§ 371 (c)(1),
(2), (4) Date: Jun. 6, 2011

(87) PCT Pub. No.: WO2009/131452
PCT Pub. Date: Oct. 29, 2009

(65) Prior Publication Data
US 2011/0236724 A1  Sep. 29, 2011

(30) Foreign Application Priority Data

Apr. 24, 2008 (NL) .................................. 1035340

(51) Int. Cl.
H01M 8/16 (2006.01)
H01M 8/22 (2006.01)
H01M 8/04 (2006.01)
H01M 8/06 (2006.01)

(52) U.S. Cl.
CPC .......... *H01M 8/225* (2013.01); *H01M 8/04186* (2013.01); *H01M 8/0656* (2013.01); *H01M 8/16* (2013.01); *Y02E 60/527* (2013.01)

(58) Field of Classification Search
CPC .. H01M 8/16; H01M 8/04186; H01M 8/2258

USPC ..................................................... 429/2, 401
See application file for complete search history.

(56) References Cited

U.S. PATENT DOCUMENTS

| 2006/0063043 A1 | 3/2006 | Zeikus et al. |
| 2008/0220292 A1 | 9/2008 | Rabaey et al. |

FOREIGN PATENT DOCUMENTS

| EP | 1 742 288 | 1/2007 |
| WO | WO-2007073598 A1 | 7/2007 |
| WO | WO-2007131022 A2 | 11/2007 |

OTHER PUBLICATIONS

Du et al., "A state of the art review on microbial fuel cells: A promising technology for wastewater treatment and bioenergy", Biotechnology Advances, vol. 25, pp. 464-482, Jul. 12, 2007.

(Continued)

*Primary Examiner* — Ula C Ruddock
*Assistant Examiner* — Frank Chernow
(74) *Attorney, Agent, or Firm* — Harness, Dickey & Pierce, P.L.C.

(57) ABSTRACT

A device includes a first electrode compartment, the anode compartment, and a second electrode compartment, the cathode compartment, with a quantity of an anode fluid including an electrochemically oxidizable substrate and optional further compounds in the anode compartment, a quantity of a cathode fluid including an electrochemically reducible substrate and optional further compounds in the cathode compartment, and further an anode at least partially in contact with the anode fluid in the anode compartment and a cathode at least partially in contact with the cathode fluid in the cathode compartment. In at least one embodiment, the anode and cathode are electrically connected and on the surface of the anode and the cathode a catalyst is present for respective catalysis of the electrochemical conversion of the electrochemically oxidizable substrate via an electrochemical oxidation reaction and for catalysis of the electrochemical conversion of the electrochemically reducible substrate via an electrochemical reduction reaction, the catalyst including electrochemically active micro-organisms on at least one of the anode or cathode.

30 Claims, 5 Drawing Sheets

(56) References Cited

OTHER PUBLICATIONS

Videla et al., "The Response of a Bioclectrochemical Cell with *Saccharomyces cerevisiae* Metabolizing Glucose Under Various Fermentation Conditions", Biotechnology and Bioengineering, vol. 17, pp. 1529-1543, Jan. 1, 1975.
Sonawat et al., "Towards Biochemical Fuel Cells", Proceedings of the Indian Academy of Sciences, vol. 93, No. 6, pp. 1099-1107, Aug. 1, 1984.
International Search Report.

DEVICE AND METHOD FOR PERFORMING A BIOLOGICALLY CATALYZED ELECTROCHEMICAL REACTION

The present invention relates according to a first aspect to a device suitable for performing a biologically catalyzed electrochemical reaction.

In an embodiment the device according to the invention is suitable for generating electrical energy. According to a further embodiment, the device is suitable for performing a bioelectrolysis process in which hydrogen is produced.

A further aspect of the invention relates to a method for performing a biologically catalyzed electrochemical reaction. In one embodiment the method is suitable for generating electrical energy. According to a further embodiment, the method is suitable for producing hydrogen.

Microbial fuel cells are known in the prior art, for instance from WO 2007/006107. Such a microbial fuel cell comprises an anode compartment, a cathode compartment and a membrane separating the anode compartment and the cathode compartment from each other. The anode compartment comprises anodophilic micro-organisms which are able to oxidize electron-donating organic compounds. Electrons are here fed to the bioanode in the anode compartment. The electrons are guided further over a resistor or power consumer to the cathode electric. Energy in the form of electricity is thus directly produced here by micro-organisms. According to WO 2007/006107 such electron-donating organic compounds can be glucose, sucrose, acetate and reduced compounds such as occur in for instance domestic wastewater and biorefinery effluents.

Microbial fuel cells are further described in different designs in Ter Heijne et al., (2007; Lovley, (2006a); Lovley, (2006b); and Rabaey and Verstraete, (2005). There thus exist for instance microbial fuel cells without membrane, fuel cells placed in a sediment, fuel cells constructed from plates or tubular fuel cells. The electric power now resulting from the current microbial fuel cells is too low for economic application.

In the generation of electrical energy using a microbial fuel cell the value of the electric power is important. The electric power of a microbial fuel cell is in fact equal to the energy released during the potential jump which the electrons undergo when they are relinquished by the electron donor to the electron acceptor, minus the internal energy loss in the fuel cell.

This internal loss is determined particularly by the overpotentials at the anode and cathode and the sum of all so-called Ohmic losses, which is proportional to the current strength. These Ohmic losses can be reduced, for instance by minimizing anode to cathode distance, by making use of a membrane with a low resistance and by increasing the conductivity of the anode and cathode fluids.

The energy losses due to the overpotentials consist for instance of the energy for activating the oxidation and reduction reactions, the metabolic energy for the micro-organisms and the so-called concentration losses which occur due to limited transport of chemical components in the fluids.

An additional loss of electric power is the loss of input energy of electron donor components, which can for instance leave the anode compartment through the membrane or can be used by non-anodophilic micro-organisms. The energy remaining after this input energy loss is designated as the coulomb efficiency. Values of the coulomb efficiency are known of between 12-28% (Logan and Regan, 2006) for wastewater with oxygen reduction at the cathode.

Different configurations of the fuel cell are known which have the purpose of compensating the different losses so that a more economic configuration results.

WO 2003/096467 A1 describes a microbial fuel cell with the bioanode and cathode in one upflow reactor without making use of a membrane that is costly and causes resistance. The fluid here flows first through the anode compartment and subsequently through the aerated cathode compartment. The system did not result in high electrical efficiency due to the high internal resistances and inefficient electron donor transport to the cathode and/or use thereof at the cathode.

Energy losses can be reduced by artificially increasing the conductivity of the anode and cathode fluids, as for instance demonstrated by Oh and Logan (2006). Increasing the conductivity of the anode compartment by adding salts will not work in practice because these are flushed out when the fluid is replenished with the electron donors. This can result in an environmental impact and has an adverse effect on the costs of the process.

The reduction of energy losses by minimizing the distance between the anode and cathode electrode is a frequently applied method in different designs; see for instance the summary of configurations by Logan et al. (2006).

The currently most important causes of energy losses originate from the overpotentials at the bioanode and cathode. Increasing the surface area of the electrodes is one method applied for the purpose of decreasing the current density which results in a certain reduction in these energy losses. The electrode configurations of porous conductive materials applied thus far for this purpose have the drawback however that the resistance in this system can still be too great, among other reasons because the physical transport of protons lags behind the speed of electron transfer. Systems are also susceptible to scaling and blockage.

Another possible solution to the problem of energy losses is the use of platinum or other costly, but very efficient, materials at the cathode electrode, and a better mixing of fluids in the system. The costs of these materials now form an obstacle to large-scale practical application of these materials.

The present invention has for its object to contribute toward a solution to the problems which exist in respect of energy losses in the prior art microbial fuel cells.

It has been found that prior art microbial fuel cells can be improved by making use of electrode systems in which charging and discharging of capacitive electrode particles is applied.

Electrode systems in which charging and discharging of capacitive electrode particles is applied are known as fluidized bed electrolysis cells or moving bed electrolysis cells and are described in, among others, U.S. Pat. No. 4,824,541, U.S. Pat. No. 4,272,333 and U.S. Pat. No. 5,695,629. Such electrolysis cells are used in the field of electrochemistry for the purpose, among others, of recovering metals from electrolyte solutions.

The prior art does not however describe electrode systems in which charging and discharging of capacitive electrode particles is applied in combination with electrochemically active micro-organisms. Prior to the research of the inventors of the present invention it was unknown whether electrochemically active micro-organisms could survive and display electrochemical activity on capacitive electrode particles. It was not known for instance whether electrochemically active micro-organisms can withstand the charging and discharging cycles which they undergo on capacitive electrode particles and to what extent this influences their electrochemical activity.

According to a first aspect, the present invention therefore relates to a device according to claim 1 in which use is made of an electrode system which applies charging and discharging of capacitive electrode particles with electrochemically active micro-organisms thereon.

The device according to the invention comprises an anode compartment and a cathode compartment. Suitable materials and configurations for the anode and cathode compartments are known to the skilled person.

A quantity of an anode fluid with an electrochemically oxidizable substrate is situated in the anode compartment. A quantity of a cathode fluid having an electrochemically reducible substrate is situated in the cathode compartment. The anode fluid and/or cathode fluid is gaseous or liquid at the operating temperature of the device, and is for instance an aqueous liquid. Suitable electrochemically oxidizable substrates and electrochemically reducible substrates will be known to the skilled person.

Electrochemically oxidizable substrates can for instance be selected from water, hydrogen, vegetable materials, wood materials, waste products, hydrocarbons, carbohydrates, fats, cellulose, lignin, lower alcohols, lower carboxylic acids, and amino acids, preferably natural amino acids, and derivatives such as esters and amides. These can for instance be of vegetable origin and, in accordance with a recently developed technology, can be produced in situ by root systems of plants (see Strik et al. (2008)).

Electrochemically reducible substrates can for instance be selected from water, protons or oxygen. A biologically oxidizable or a biologically reducible substrate is applied at the electrode where use is made of electrochemically active micro-organisms.

Optionally present in the anode fluid and cathode fluid are further compounds such as compounds which can support growth of electrochemically active micro-organisms, such as for instance macro and/or micro-nutrients comprising elements such as N, P and S.

In the device according to the invention an anode at least partially in contact with the anode fluid is located in the anode compartment and a cathode at least partially in contact with the cathode fluid is located in the cathode compartment. Suitable electrically conductive materials for anodes and cathodes are known in the field and can be readily selected by the skilled person. Examples of suitable materials comprise, but are not limited to, crystalline or amorphous graphite of natural or artificial origin. Other suitable materials are for instance composite materials of one or more electrically conductive metals and carbon, optionally in a polymer matrix, polystyrene, materials coated with an electrically conductive metal, and electrically conductive metals and metal alloys.

The anode and cathode are electrically connected in suitable manner. This is possible in any manner known to the skilled person.

Present on the surface of at least one of the anode and the cathode is a catalyst for respectively an electrochemical oxidation reaction and an electrochemical reduction reaction. This catalyst comprises electrochemically active micro-organisms on at least one of the anode or cathode. In the context of the present invention the term electrochemically active micro-organisms is understood to mean micro-organisms which can use an electrode directly, i.e. without use of externally added redox mediators, as electron donor (cathodophilic organisms) or as electron acceptor (anodophilic organisms). The existence of anodophilic organisms and methods for obtaining these is described in the professional field in inter alia "Principle and perspectives of hydrogen production through biocatalyzed electrolysis" (*International Journal of Hydrogen Energy* 2006, 32, 1632-1640) in the name of Rozendal, R. A. et al., and in "Electricity production by *Geobacter sulfurreducens* attached to electrodes" *Applied and Environmental Microbiology* 2003, 69, 1548-1555 in the name of Bond, D. R. and Lovley, D. R.). A cathodophilic microbial culture is described by Alain Bergel, Damien Féron & Alfonso Mollica in "Catalysis of oxygen reduction in PEM fuel cell by seawater biofilm", Electrochemistry Communications 7, 2005, 900-904. Cathodophilic hydrogen-producing micro-organisms have also been recently described (Rozendal et al. 2008). These can also be applied in the present invention. Microbial cultures are also known which can form methane from protons, electrons and $CO_2$. These can also be applied within the scope of the present invention.

The device according to the invention is characterized in that use is made of an electrode with capacitive bioelectrode particles which can be charged, in the case of a capacitive cathode, or discharged, in the case of a capacitive anode, at a charge conductor. This is achieved in that in the device at least one of the anode or cathode comprising electrochemically active micro-organisms is formed by a plurality of capacitive bioelectrode particles of a first electrically conductive material in combination with a number of charge conductors of a second electrically conductive material.

The bioelectrode particles comprise a suitable first electrically conductive material. All electrically conductive materials are in principle suitable as long as they have capacitive properties and can serve as suitable carrier for electrochemically active micro-organisms. The materials given as example of suitable materials for the anode and cathode can be applied. According to an embodiment, the electrically conductive material of the bioelectrode particles preferably has a density which facilitates application of the particles in a packed bed, such as a fluidized bed or a moving bed. According to a further embodiment, the particles have a density which limits sedimentation when applied in a CSTR or other stirred reactor.

Of further importance is that the first electrically conductive material has capacitive properties. This means that it can store electric charge for at least a short period of time, particularly in a solution. It is known that an electrically conductive material can store charge (an excess or shortage of electrons) in a solution with charged species. An excess of electrons (negative charge) can here be stabilized to some extent by positive species from the solution. This double-layer capacity is a known principle in the field of electrochemistry.

The number of charge conductors are formed from a suitable second electrically conductive material. The second electrically conductive material can be identical to or differ from the first electrically conductive material. Capacitive properties are of minor importance in the choice of the second electrically conductive material, although it is noted that the chosen material can have capacitive properties. Suitable materials can be selected from, but are not limited to, crystalline or amorphous graphite of natural or artificial origin. Examples of other materials are titanium, such as coated titanium, gold and stainless steel.

The number of charge conductors are incorporated in the electrical connection between the anode and cathode. In the context of the present invention a number is understood to mean one or more each time this term is used, unless stated otherwise.

Further provided in the device are means for causing movement of the bioelectrode particles relative to the number of charge conductors such that electrical contact between bioelectrode particles and the number of charge conductors can be regulated. These movements are such that electrical charging, in the case of a capacitive biocathode, or electrical discharging, in the case of a capacitive bioanode, of bioelectrode particles is possible at the number of charge conductors. It is also possible for the bioelectrode particles to move relative to each other. It is further possible for the bioelectrode particles to transfer charge between each other. In respect of this latter it is necessary to prevent the mutual charging/discharging of particles from assuming such proportions that a short-circuit current is created through the mass of capacitive bioelectrode particles to the charge conductor.

The skilled person will appreciate that capacitive bioelectrode particles applied in a capacitive electrochemical bioanode according to the invention will be electrochemically charged by an electrochemical oxidation reaction, whereby they acquire a determined electrical potential, and are electrically discharged at a charge conductor with a lower electrical potential. Conversely, capacitive bioelectrode particles applied in a capacitive electrochemical biocathode according to the invention will be electrically charged at a charge conductor with a higher electrical potential, whereby they acquire a determined electrical potential, and are electrochemically discharged by an electrochemical reduction reaction. It is assumed that electrical discharging or charging proceeds more quickly in many cases than electrochemical charging or electrochemical discharging. In order to properly utilize the capacitive properties of the bioelectrode particles, it is therefore recommended that the bioelectrode particles have sufficient time for the electrochemical charging or electrochemical discharging before they are electrically discharged or charged. In order to achieve this, bringing the bioelectrode particles into contact with the charge conductor can be correlated to the potential of the bioelectrode particles relative to the equilibrium potential, under the process conditions, of the electrochemical reaction being performed by the electrochemically active micro-organisms of the bioelectrode particles. The means for bringing the bioelectrode particles into contact with the charge conductor are therefore preferably adjusted such that the bioelectrode particles are on average brought into contact with the charge conductor when their potential differs less than 150 mV, preferably less than 80 mV, more preferably less than 50 mV, most preferably less than 25 mV, from the equilibrium potential, under the process conditions, of the electrochemical reaction being performed by the electrochemically active micro-organisms of the bioelectrode particles. The skilled person will appreciate that for a bioanode particle the equilibrium potential, under the process conditions, of the electrochemical reaction performed by the electrochemically active micro-organisms is the theoretical minimum for the potential of the bioanode particle. And that for a biocathode particle this equilibrium potential, under the process conditions, of the electrochemical reaction performed by the electrochemically active micro-organisms is the theoretical maximum. On the basis of knowledge of the process conditions the skilled person will be able to determine appropriate average frequencies for bringing the bioelectrode particles into contact with the charge conductor. The means for bringing the bioelectrode particles into contact with the charge conductors, for instance pumps and/or stirrers, can be regulated in a manner known to the skilled person. The bioelectrode particles will generally be dispersed in the cathode fluid or the anode fluid. A dispersion of bioelectrode particles here also comprises a fluidized bed, including a moving bed of bioelectrode particles. The means for causing movement of the bioelectrode particles in the described manner can comprise all means suitable for causing movement of units of volume of such a suspension of bioelectrode particles relative to each other, such as mixing and/or stirring means. Suitable mixing and/or stirring means comprise for instance mixers and/or stirrers, including rotors.

According to an embodiment, the bioelectrode particles preferably have a dimension and form suitable for use in a packed bed, such as a fluidized bed or a moving bed. Another method of application is circulation of the particles in a stirred reactor, preferably a continuous stirred-tank reactor (CSTR). A further alternative is use in a plug flow reactor and reactor systems approximating a plug flow, including an (airlift) loop reactor. According to a further preferred embodiment, the bioelectrode particles have a dimension and form suitable for these applications. Dimensions and forms of the bioelectrode particles suitable for the above stated applications are known to the skilled person or can be determined in simple manner.

Subject to the application and specific process conditions, particles can be applied with an average diameter in the order of magnitude of several tens of nanometers to several centimeters. Suitable distributions in the nanometer range are from 10 nm to 1 µm, such as from 200 nm to 800 nm. Suitable distributions in the nanometer range are from 1 µm to 1000 µm, such as from 20 µm to 800 µm, for instance from 200 µm to 600 µm. Suitable distributions in the centimeter range are from 0.5 cm to 3.0 cm, such as from 1.0 cm to 2.5 cm, for instance from 1.0 cm to 1.5 cm, such as from 10 µm to 3.0 cm. Average diameter is understood to mean the average Stokes diameter.

In addition to electrochemically active micro-organisms, other micro-organisms can also attach themselves to the bioelectrode particles. According to a preferred embodiment, the electrochemically active micro-organisms make up more than 50%, such as more than 70%, preferably more than 80%, such as more than 90% of the total of micro-organisms on the bioelectrode particles. At this quantity of electrochemically active micro-organisms the microbial culture on the bioelectrode particles will display a high degree of electrochemical activity.

In another embodiment the electrochemically active micro-organisms are selected from anodophilic micro-organisms, for instance of the genus *Geobacter*, such as *Geobacter sulferreducens* or *Geobacter metallireducens*, of the genus *Shewanella*, such as *Shewanella putrefaciens*, of the genus *Rhodoferax*, such as *Rhodoferax ferrireducens*, or a consortium of one or more organisms from this group. Anodophilic micro-organisms are well known in the field and suitable for application on an anode.

In yet another embodiment the electrochemically active micro-organisms are selected from cathodophilic micro-organisms. Alain Bergel, Damien Féron & Alfonso Mollica describe in "Catalysis of oxygen reduction in PEM fuel cell by seawater biofilm", Electrochemistry Communications 7, 2005, 900-904, the existence of a cathodophilic microbial culture which is able to catalyze oxygen reduction. Such a microbial culture can be applied in an embodiment in the present invention.

According to another embodiment, the microbial culture in the present invention forms a cathodophilic, hydrogen-producing microbial culture. Such a microbial culture is able to produce hydrogen in electrochemical manner without the use of external redox mediators. The microbial culture comprises micro-organisms able to produce hydrogen by means of proton reduction and/or water reduction, as described in for instance one of the following reaction equations:

$$2H^+ + 2e^- \rightarrow H_2 \tag{1a}$$

or $$2H_2O + 2e^- \rightarrow H_2 + 2OH^- \tag{1b}$$

Such a cathodophilic, hydrogen-producing microbial culture can be a monoculture or a mixed culture and is described by Rozendal et al. (2008).

In another preferred embodiment capacitive particles of an electrically conductive material, which are substantially free of electrochemically active micro-organisms, are present in addition to the bioelectrode particles. Due to the addition of additional capacitive particles of an electrically conductive material, the bioelectrode particles on which electrochemically active micro-organisms are present can absorb charge (for a cathode) or relinquish charge (for an anode) more quickly. This is because charge transfer can also take place here with the particles free of electrochemically active micro-organisms.

According to a further preferred embodiment, the bioelectrode particles take the form of foam particles, powder particles, grains, needles, brush bristles or strips. These forms depend on the process conditions suitable for ensuring sufficient physical transport and for providing resistance to shear forces. In the present invention it is important that the bioelectrode particles have an electrical capacitance, so that they can retain sufficient electrical charge until discharge takes place. In an embodiment the bioelectrode particles have an average electrical capacitance of at least $2\ \mu F/cm^2$, such as at least $10\ \mu F/cm^2$, preferably at least $50\ \mu F/cm^2$, such as at least $100\ \mu F/cm^2$. The capacitance of the bioelectrode particles can be determined by means of electrochemical analysis methods such as impedance spectrometry.

In one embodiment the bioelectrode particles have per gram of mass an average specific area of at least $500\ m^2$, such as at least $600\ m^2$, preferably at least $700\ m^2$, such as at least $1000\ m^2$, this in order to make available a sufficiently large electrode surface area. The specific area of the particles can be determined by determining the average area diameter and average volume diameter of the particles using SEM (Scanning Electron Microscope). From these data and the density of the applied substance the specific area of the particles can then be determined. If the surface of the particles is not smooth and/or if the particles are porous, the specific area is determined from adsorption experiments. Different quantities of a chemical component are here first adsorbed to a material with a known surface area. The tests are then repeated with the particles whose specific area must be determined. The specific area of the particles can be determined from the two thus obtained adsorption isotherms.

According to a further preferred embodiment of the device, the anode compartment and cathode compartment are separated by a material allowing passage of protons, while the passage of at least some of the other constituents of the anode fluid and cathode fluid is at least inhibited. Such material can for instance comprise a cation-exchanging part, such as a cation-exchanging membrane, or be a material comprising an anion-exchanging part such as an anion-exchanging membrane. Such materials are known to the skilled person.

According to yet another preferred embodiment, the device comprises separate compartments for charging and discharging of the bioelectrode particles. It is hereby possible to specifically adapt the process conditions for charging and discharging to these processes.

The device according to the invention is suitable for performing a biologically catalyzed electrochemical reaction, and can be used for instance as microbial fuel cell. Using a microbial fuel cell electrical energy can be generated, as the skilled person is aware, using a biologically catalyzed electrochemical reaction. This electrical energy can be used by an electric power consumer (an apparatus which consumes electric power).

The device according to the invention can further be used as electrolysis device for biocatalyzed electrolysis. In biocatalyzed electrolysis bio-oxidizable material is split into carbon dioxide and hydrogen under the influence of a potential difference between anode and cathode. This can be represented schematically as:

$$[CH_2O] + H_2O \rightarrow 2H_2 + CO_2 \quad (2)$$

This process is described in the international patent application WO 2005/005981 and in the publication "Principle and perspectives of hydrogen production through biocatalyzed electrolysis" (*International Journal of Hydrogen Energy* 2006, 31, 1632-1640) in the name of Rozendal, R. A. et al.

Electrical energy is consumed during hydrogen-producing electrolysis processes. This electrical energy must be supplied by a power source. In biocatalyzed electrolysis the use of a cathodophilic, hydrogen-producing microbial culture is particularly advantageous.

Microbial cultures are also known which are able to produce methane, for instance via the reaction:

$$8H^+ + 8e^- + CO_2 \rightarrow CH_4 + 2H_2O \quad (3)$$

Electrical energy is also consumed here which has to be supplied by a power source. As the skilled person will appreciate, activity of these organisms will compete with electrochemical hydrogen production. If hydrogen production is preferred, the amount of carbon substrate (for instance $CO_2$) must therefore be limited in the cathode compartment.

As will be apparent from the foregoing, electrical energy and/or hydrogen and/or methane can be produced with the device according to the invention. Hydrogen production and methane production and the generation of electrical energy do however require different process optimizations, as will be apparent to the skilled person. Hydrogen production and methane production thus require for instance the use of a power source for the purpose of supplying electric power. Methane production is further assisted by the presence of $CO_2$ in the cathode compartment, while this can have an adverse effect on the production of hydrogen. According to an embodiment, the device is therefore specifically adapted to hydrogen production. Such a device specially adapted to hydrogen production is not optimized for the purpose of generating electrical energy or methane, and is preferably not intended for this purpose. According to another embodiment, the device is specifically adapted to generate electrical energy. Such a device specifically adapted to generate electrical energy is not optimized for the purpose of producing hydrogen or methane, and is preferably not intended for this purpose. According to yet another embodiment, the device is specifically adapted to the production of methane. Such a device specifically adapted to methane production is not optimized for the purpose of producing hydrogen or electrical energy, and is preferably not intended for this purpose.

Due to the presence of the electrochemically active micro-organisms therein, the device is suitable for performing a biologically catalyzed electrochemical reaction. Another aspect of the invention therefore relates to a method for performing an electrochemical reaction. The method comprises the steps of:
(i) providing a device according to the invention;
(ii) causing movement of the bioelectrode particles relative to the number of charge conductors such that charging or discharging of bioelectrode particles on the number of charge conductors can take place;
(iii) allowing the electrochemical oxidation reaction in the electrochemical reduction reaction to proceed;

so that an electric current flows between the cathode and anode.

In the method according to the invention use is made of a device according to the invention. The electrical contact between bioelectrode particles and the number of charge conductors is regulated by operating the means for causing movement of the bioelectrode particles relative to the number of charge conductors. The electrochemical oxidation reaction and the electrochemical reduction reaction are also allowed to proceed. Due to the capacitive properties of the bioelectrode particles, used anode particles will be electrochemically charged as a result of the electrochemical activity of the electrochemically active micro-organisms. Such capacitively charged anodic bioelectrode particles can be discharged electrically at the charge conductor by relinquishing their excess of electrons thereto. These relinquished electrons can be used at the cathode in an electrochemical reduction reaction. If capacitive cathodic bioelectrode particles are used, these can be electrically charged at the charge conductor in the cathode compartment due to the lower electrical potential thereof. Such capacitively charged cathodic bioelectrode particles can be electrochemically discharged by consuming their excess of electrons in an electrochemical reduction reaction performed by the electrochemically active micro-organisms. The supply of electrons to the cathode is sustained by an electrochemical oxidation reaction which takes place at the anode. During performing of the method according to the invention an electric current will flow between the cathode and the anode (electrons will flow from the anode to the cathode).

According to an embodiment of the method, the electric current is used to perform electric work, for instance with an electric power consumer such as an electrical apparatus. Such a method is preferably intended for the purpose of generating electrical energy, and less suitable for producing hydrogen, and more preferably not intended for the purpose of producing hydrogen.

A method for producing hydrogen forms part of another embodiment of the method according to the invention. In the device provided according to the invention the electrical connection between the anode and cathode here comprises a power source, reactants for the electrochemical production of hydrogen are present in the cathode fluid, and a catalyst for the electrochemical production of hydrogen is present on the cathode, such as platinum or an electrochemically active hydrogen-producing microbial culture. Using the power source a potential is applied to the cathode in this embodiment which is lower than the equilibrium potential of the $H^+/H_2$ redox couple in the cathode fluid, and hydrogen formed at the cathode is discharged. As a consequence of optimizations for the purpose of producing hydrogen and due to the investment of electric power from the power source, this method is less suitable for generating electrical energy, and preferably not intended for the purpose of generating electrical energy. For the production of hydrogen it is advantageous to limit activity of methanogenic micro-organisms in the cathode compartment, since these consume hydrogen and/or protons in combination with electrons. This is possible for instance by using a low pH of below pH 5.0, such as below pH 4.0. It is known that methanogenic organisms are inhibited by such a low pH value. In addition, growth of methanogenic bacteria can be inhibited by minimizing the concentration of carbon dioxide once the microbial culture has grown sufficiently. A $PCO_2$ of below 0.0003 atmosphere, such as below 0.0002 or below 0.0001 atmosphere can be used for this purpose.

A method for producing methane forms part of a further embodiment of the method according to the invention. In the device provided according to the invention the electrical connection between the anode and cathode here comprises a power source, reactants for the methane production are present in the cathode fluid and a catalyst for the electrochemical production of methane is present on the cathode, such as a catalyst selected from the group of platinum, Cu, Ru, Mo or an electrochemically active methane-producing microbial culture. Using the power source a potential is applied in this embodiment to the cathode which is lower than the equilibrium potential of the $CO_2/CH_4$ redox couple in the cathode fluid. The formed methane is discharged. For a good activity of methanogenic bacteria a pH of above pH 4.0, such as above pH 5.0, for instance above pH 6.0, is recommended for the production of methane. It is known that methanogenic organisms are inhibited by a lower pH value. In addition, growth of methanogenic bacteria can be inhibited by low concentrations of carbon dioxide. A $PCO_2$ of above 0.0001 atmosphere, such as above 0.0002 or above 0.0003 atmosphere, for instance above 0.0004 atmosphere is therefore recommended for the production of methane.

As a consequence of optimizations for the purpose of producing methane and due to the investment of electric power from the power source, this embodiment of the method is less suitable for generating electrical energy and/or hydrogen production, and this embodiment is preferably not intended for this purpose.

The invention is now further elucidated on the basis of the following examples and the accompanying figures, which show non-limitative exemplary embodiments of the invention.

Figure 1A:
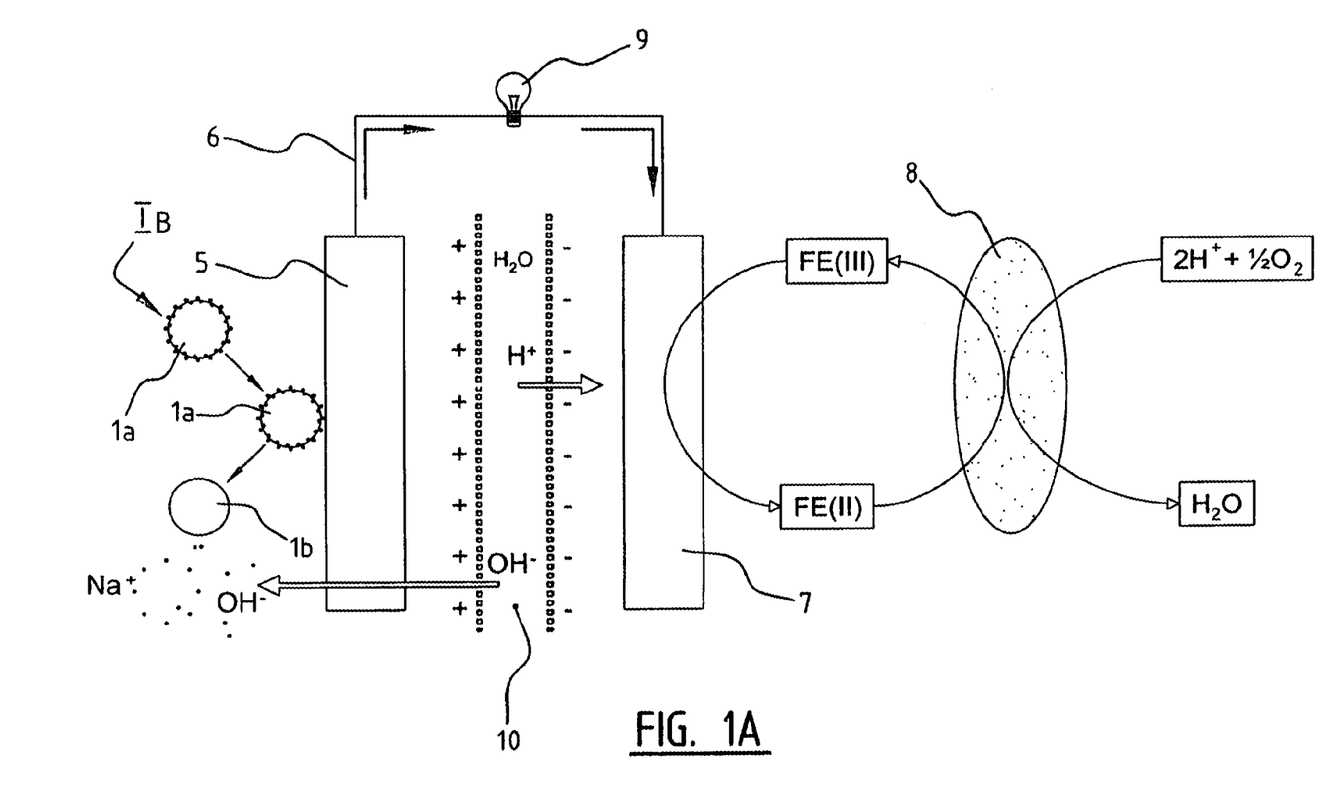
FIG. 1A shows on the basis of a capacitive bioanode an outline of the concept of the capacitive bioelectrode according to the invention.
Figure 1B:
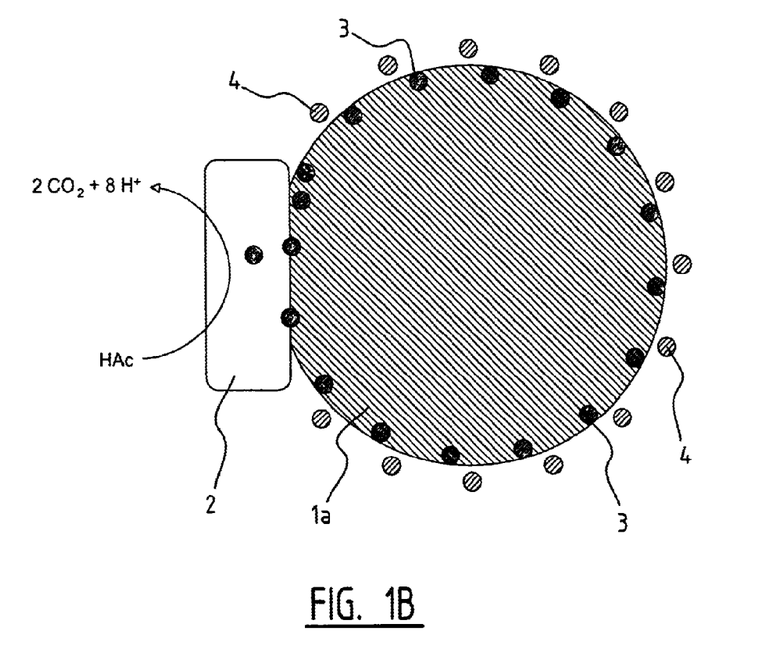
FIG. 1B shows a detail of FIG. 1A.

FIG. 1A shows a bioanode particle in charged state 1a. Bioanode particle 1 is formed from a graphite core. Present on the graphite are anodophilic micro-organisms 2 which oxidize an organic substrate, here acetate, in anaerobic manner to $CO_2$, electrons and protons. This process is shown schematically in FIG. 1B. The formed electrons 3 are stored in the graphite, which has capacitive properties. Because the graphite material becomes to some extent negatively charged due to the storage of electrons, cations 4, such as protons, from the solution remain associated with the charged bioanode particle 1a. The charged bioanode particle 1a can be electrically discharged to form a discharged bioanode particle 1b on a charge conductor 5. The associated cations are here released to the solution. Charge conductor 5 is here in contact with a cathode 7 via an electrical circuit 6. At cathode 7 the electrons are consumed in an electrochemical reduction reaction, here the reduction from Fe(III) to Fe(II). An iron-oxidizing micro-organism 8 can be used in order to recover Fe(III). The electron flow from charge conductor 5 to cathode 7 can be used to perform electric work with an electric power consumer 9 in electrical circuit 6. Electrical neutrality of the fluids in the anode compartment and the cathode compartment is maintained here by net proton transport from the anode compartment to the cathode compartment. Use is made for this purpose in the system of FIG. 1A of a bipolar membrane 10. In this bipolar membrane 10 separation of water to $OH^-$ and $H^+$ takes place under the influence of the membrane potential. $OH^-$ associates to water with the protons released in the anaerobic oxidation reaction in the anode compartment. $H^+$ is consumed in the reduction of oxygen to water in the cathode compartment, a reaction which is catalyzed here by the iron-oxidizing micro-organism 8. By placing the bipolar membrane 10 in the vicinity of charge conductor 5 the protons 4 associated with the charged bioanode particle 1a are released from the charged bioanode particle 1a in the vicinity of bipolar membrane 10. This shortens the path of the free physical transport of protons and thereby reduces the electrical resistance in the system.

Figure 2:
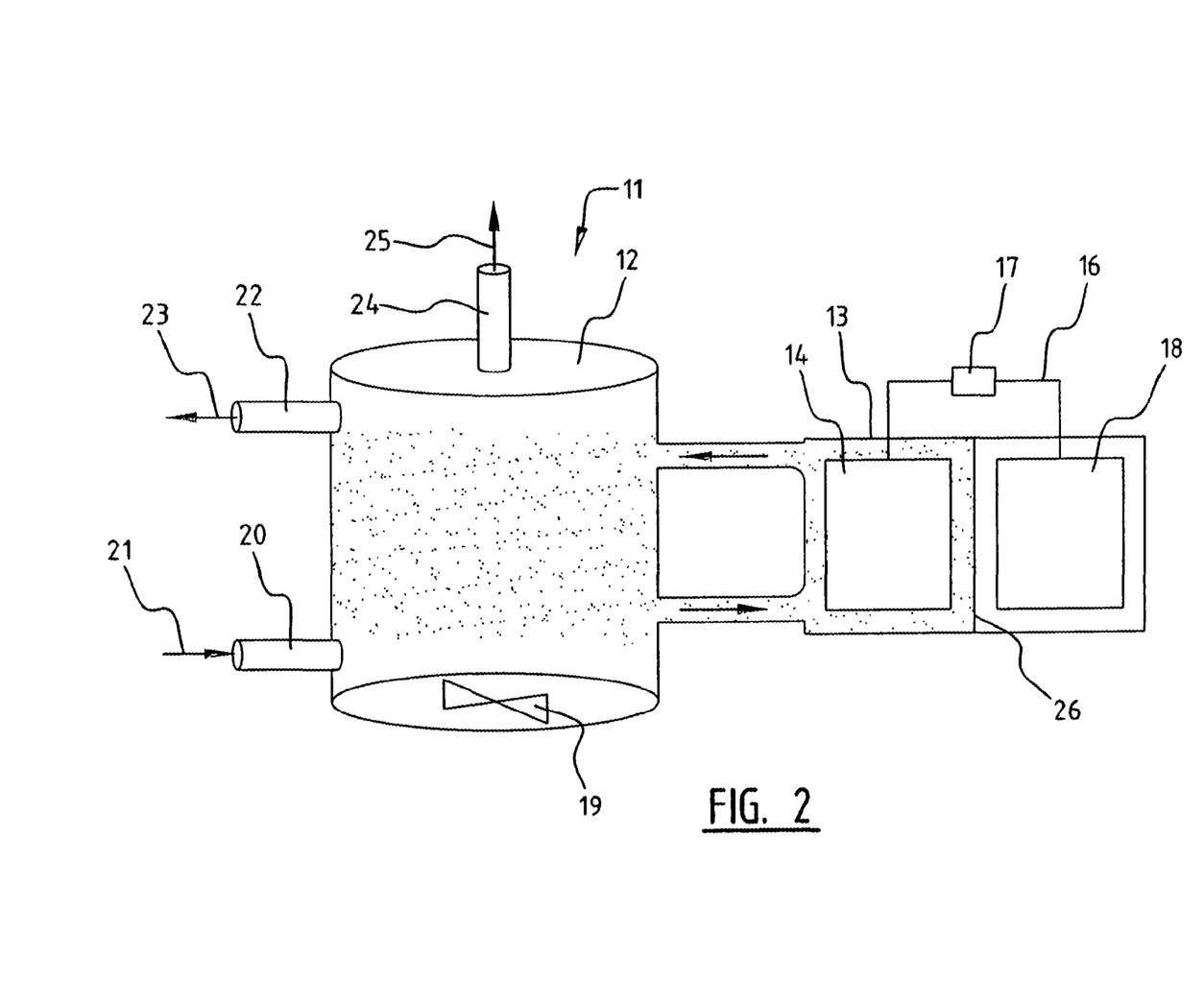
FIG. 2 shows a first embodiment of the device according to the invention.

In the embodiment of device 11 in FIG. 2 the anode 12, 13 is divided into a charging reactor 12, in the form of a fully mixed reactor (CSTR), coupled to a discharging reactor 13 where charge conductor 14 is placed. A membrane 26 separates anode compartment 12, 13 from cathode compartment 15. An electrical circuit 16 connects charge conductor 14 in anode compartment 12, 13 to cathode electrode 18 via a resistor or a device 17 which consumes electrical energy. Charging reactor 12 is mixed by a mixer 19. Influent 21 comprising electron-donating components flows into charging reactor 12 via an inlet 20. Effluent 23 comprising the treated influent flows out of charging reactor 12 via an outlet 22. A discharge 24 provides for the removal of produced biogas 25. In this anodic embodiment the charging reactor is optimized for the purpose of performing the electrochemical reaction of anodophilic micro-organisms. The discharging reactor is optimized for the purpose of discharging charged bioelectrode particles.

Figure 3:
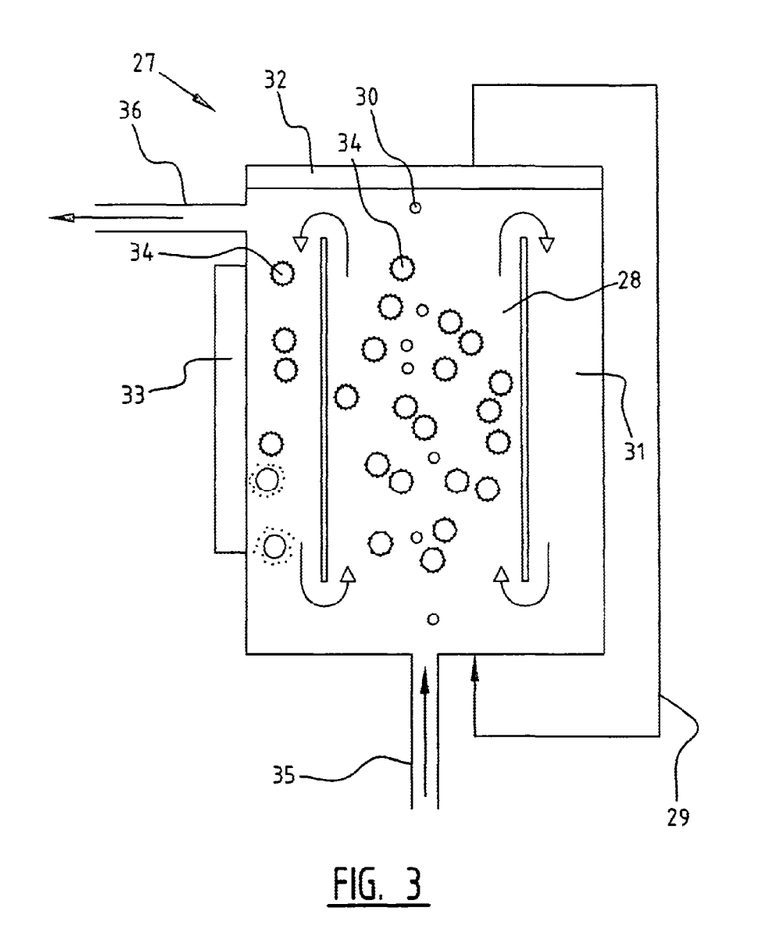
FIG. 3 shows a second embodiment of the device according to the invention.

FIG. 3 shows a section through an alternative embodiment of the device according to the invention. In this embodiment the anode compartment 27 is embodied as an airlift loop reactor with an internal loop. Gas 30 is blown from gas conduit 29 into the internal rise section 28 in order to create a difference in density between the fluid in rise section 28 and fall sections 31. The gas from head space 32 can be recirculated and fed back to gas conduit 29. Owing to the lower density of the fluid in rise section 28 relative to the fluid in fall sections 31 there is created a fluid circulation as indicated by the curved arrows. Charge conductor 33 for discharging charged bioanode particles 34 is arranged in fall sections 31 (shown only on one side). Charge conductor 33 is in electrical contact with a cathode (not shown). There is also a proton guiding partition (not shown) which enables net transport of protons between the cathode fluid (not shown) and anode fluid. There is thus the possibility in rise section 28 of bioelectrode particles 34 being electrically charged under the influence of the activity of electrochemically active micro-organisms. These herein convert substrate flowing into the anode compartment with the influent via inlet 35. Effluent with converted substrate leaves the anode compartment via outlet 36.

EXAMPLE 1

A vertically placed tubular microbial fuel cell was manufactured from Schott Duran glass. The height of the tube was 30 cm and the diameter 3.5 cm. At a height of 2 and 28 cm there were two branches through which the anode medium was circulated via a pump using a peristaltic pump. The upper part of the tube was closed with a cap and provided with an Ag/AgCl reference-electrode (ProSense Qis, Oosterhout, Netherlands) in order to measure the anode potential. A cation-exchange membrane (type FKL, FuMA-tech GmbH, St. Ingbert, Germany) was placed on the underside by means of a GL45 screw cap with a recess (diameter: 3 cm). The tube was filled with 81 gram capacitive graphite grains (diameter between 1.5 and 3 mm; Le Carbone, Belgium). A gold thread was positioned in the grains as charge conductor and coupled to the electrical circuit by a rubber seal. A 3 mm thick graphite felt (dimensions: 8×8 cm; FMI Composites Ltd., Galashiels, Scotland) was placed on the bottom of a large beaker. The glass tube, and parallel thereto a graphite rod, were then placed on this graphite felt. The anode and cathode electrodes were formed by the graphite components on respectively the inner side and outer side of the glass tube. The electrical circuit of the anode and cathode was closed from the gold thread and the graphite rod via plasticized copper threads to an external resistor R of 100 Ohm. The arrangement was placed in a climate chamber at a temperature of 30 degrees Celsius.

The microbial fuel cell was started up with an anode medium with 10 ml Pokon (Pokon Chrysal International) per L demineralized water and 4 ml 2 M phosphate buffer of pH 7 ($K_2HPO_4$ and $KH_2PO_4$) per L demineralized water. The cathode medium consisted at startup of 4 ml 2 M phosphate buffer of pH 7 ($K_2HPO_4$ and $KH_2PO_4$) per L demineralized water. The reactor was inoculated with anode medium from another microbial fuel cell which was fed with potassium acetate. The microbial fuel cell was started up with 3 ml 3 M potassium acetate and then fed regularly with 2 M acetic acid until there was a stable electricity production. The cathode medium was then replaced by a solution of 50 mM $K_3Fe(CN)_6$ with 100 mM $KH_2PO_4$ (pH 7), and there was once again a wait until a stable electricity production was realized.

Ag/AgCl reference-electrodes (ProSense Qis, Oosterhout, Netherlands) were used to measure the electrode potentials. Using FieldPoint (National Instruments, Netherlands) FP-AI-110 modules and a personal computer (Pentium III) and a self-programmed Labview 7.0 (National Instruments, Netherlands) program the cell voltage, the anode and the cathode potential were measured continuously. Following the start-up period amperometric measurements were performed on day 30 with an IVIUMstat (IVIUM technologies, Netherlands). A cell voltage of 0.149 mV was set here, this being equal to the cell voltage which the microbial fuel cell had at the external resistance used, and an open cell was then manually created a number of times. At the open cell moment the electrons can no longer be relinquished by the graphite grains with micro-organisms and a charging thus takes place by means of the micro-organisms. At the moment that the electrical circuit is closed once again, the graphite grains with micro-organisms can once again relinquish their electrons, and this therefore results once again in electricity. The mobile capacitive graphite grains were pumped externally through the reactor. Charging here took place first and was followed by a discharge at the moment that the grain came into contact with the anode electrode.

Figure 4:
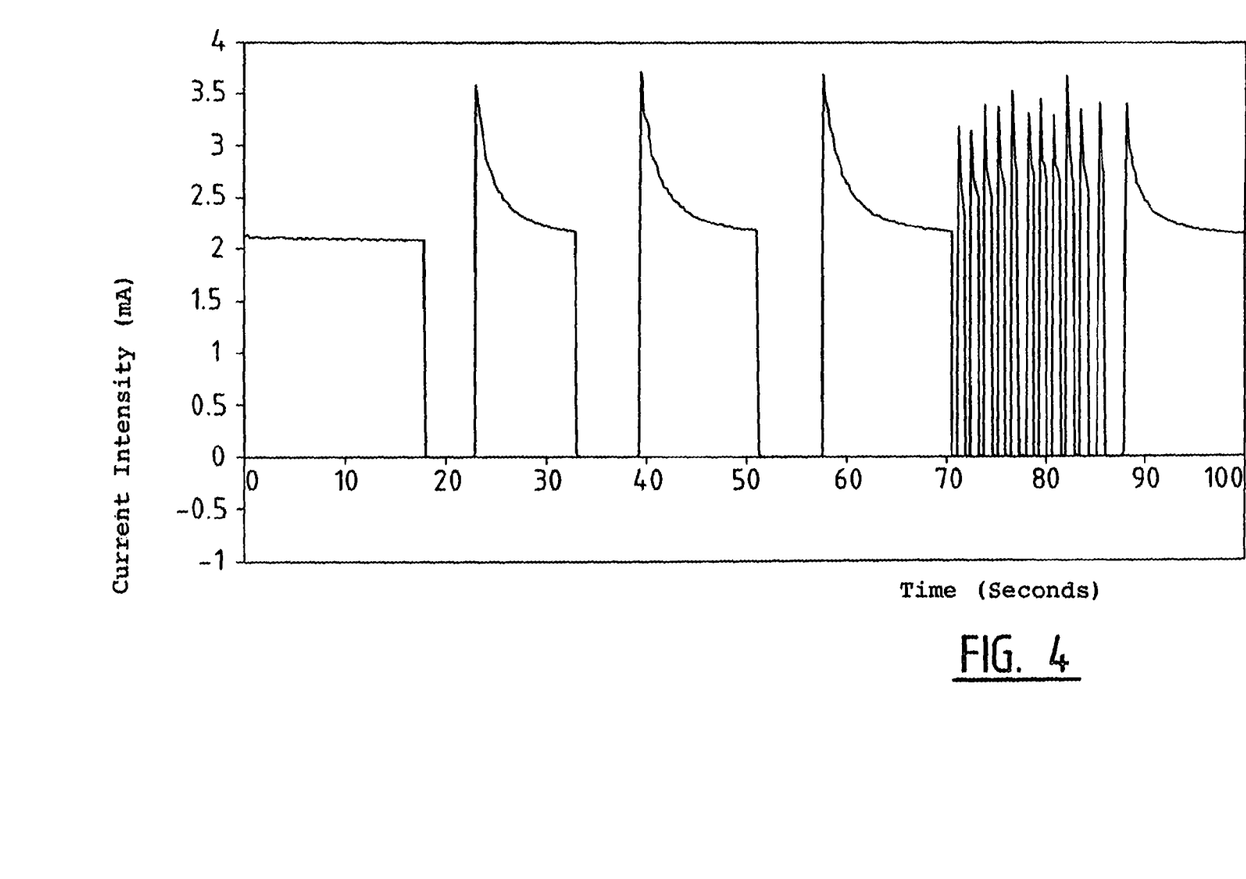
FIG. 4 shows experimental measurement results from the experiment of example 1.

FIG. 4 shows the results of this experiment. After the open cell situation a peak current was detected which was clearly higher than the electricity production with a closed circuit. The electricity production stabilized after the open cell. These results demonstrate mobile, capacitive bioanode electrode components which were charged microbiologically and could then be discharged at the current collector (here the gold thread). It was possible to repeat this experiment a number of times, also when the open cell situation lasted half a second (see time period between 70 and 90 seconds). This experiment therefore gives an example of how capacitive mobile anode components such as graphite grains can be used in a microbial fuel cell.

EXAMPLE 2

In this example an anaerobic CSTR, the charging reactor, was coupled to a microbial fuel cell as illustrated schematically in FIG. 2. The anodic bioelectrode particles of graphite are present in the CSTR in an expanded bed. Influent consisting of a mix of waste substances and produced organic compounds was converted herein by anodophilic anaerobic micro-organisms into biogas largely consisting of methane and carbon dioxide. The micro-organisms present used the electrically conductive material of the anodic bioelectrode particles as electron acceptor. The micro-organisms herein charged the bioelectrode particles. Some of these micro-organisms grew in a biofilm on the bioelectrode particles. During charging the electrical energy was stored in the electric double layer present on the surface of the bioelectrode particles. The bioelectrode particles were transported, for instance by means of a pump, to the discharge compartment with a compact and efficient anodic charge conductor. The bioelectrode particles were there discharged to the charge conductor which was placed closely to the membrane, whereby the ion transport distance through the membrane was minimal. The Ohmic losses were hereby minimal. On the cathode electrode platinum was used in this example as efficient catalyst for the reduction of oxygen to water. The loss of electricity production due to the cathode electrode overpotential was hereby minimal. The device finally produced electricity here which can be used for diverse purposes.

REFERENCE

Logan, B. E., B. Hamelers, R. Rozendal, U. Schroeder, J. Keller, S. Freguia, P. Aelterman, W. Verstraete, and K. Rabaey. 2006. Microbial fuel cells: Methodology and technology. Environmental Science and Technology 40, 5181-5192;

Logan, B. E. and J. M. 2006. Regan, Electricity-producing bacterial communities in microbial fuel cells. Trends in Microbiology, 14 (12), 512-518;

Lovley D. R. 2006a. Bug juice: harvesting electricity with microorganisms. Nature Reviews Microbiology 4, 497-508;

Lovley D. R. 2006b. Microbial fuel cells: novel microbial physiologies and engineering approaches. Current Opinion in Biotechnology 17, 327-332;

Oh, S. and B. E. Logan. 2006. Proton exchange membrane and electrode surface areas as factors that affect power generation in microbial fuel cells. Appl. Microbiol. Biotechnol. 70(2):162-169.

Rabaey, K., and W. Verstraete. 2005 Microbial fuel cells: sustainable core technology. Trends in Biotechnology 23, 291-298.

Rozendal, R. A., Jeremiasse, A. W., Hamelers, H. V. M. and Buisman, C. J. N. 2008. Hydrogen production with a microbial biocathode. Environ. Sci. Technol., 42, 629-634.

Strik, D. P. B. T. B., Hamelers, H. V. M., Snel, J. F. H., Buisman, C. J. N. 2008. Green electricity production with living plants and bacteria in a fuel cell. Int. J. Energy Res.

Ter Heijne A., Hamelers, H. V. M., De Wilde, V., Rozendal, R. A., and C. J. N. Buisman. 2007. Microbial fuel cell operation with continuous biological ferrous iron oxidation of the catholyte. Environ. Sci. Technol. 41(11): 4130-4134.

The invention claimed is:

1. A device comprising:
an anode compartment including a quantity of an anode fluid comprising an electrochemically oxidizable substrate and optional further compounds;
a cathode compartment including a quantity of a cathode fluid comprising an electrochemically reducible substrate and optional further compounds;
an anode at least partially in contact with the anode fluid in the anode compartment; and
a cathode at least partially in contact with the cathode fluid in the cathode compartment, the anode and the cathode being electrically connected and a catalyst being present on a surface of the anode and the cathode for respective catalysis of an electrochemical conversion of the electrochemically oxidizable substrate via an electrochemical oxidation reaction and catalysis of the electrochemical conversion of the electrochemically reducible substrate via an electrochemical reduction reaction, the catalyst comprising electrochemically active micro-organisms on at least one of the anode or cathode, at least one of the anode or cathode comprising electrochemically active micro-organisms being adapted as a plurality of capacitive bioelectrode particles capable of charging and discharging combined with a number of charge conductors, the capacitive bioelectrode particles comprising a first electrically conductive material with electrochemically active micro-organisms thereon, wherein the first electrically conductive material has capacitive properties to store an electric charge, and wherein the number of charge conductors, of a second electrically conductive material, are incorporated in the electrical connection between the anode and cathode and wherein a mixing and/or a stirring means selected from the group consisting of a mixer, a stirrer, a pump, a gaslift and a combination thereof are provided for causing movement of the bioelectrode particles relative to the number of charge conductors such that electrical contact between bioelectrode particles and the number of charge conductors are regulatable, so that charging or discharging of bioelectrode particles is possible at the number of charge conductors.

2. The device as claimed in claim 1, wherein the average diameter of the bioelectrode particles lies between 10 nm and 3.0 cm.

3. The device as claimed in claim 1, wherein the first electrically conductive material is selected from graphite, a composite material of a metal and carbon, and a metal.

4. The device as claimed in claim 1, wherein the electrochemically active micro-organisms make up more than 50% of the micro-organisms on the bioelectrode particles.

5. The device as claimed in claim 1, wherein the electrochemically active micro-organisms are selected from anodophilic micro-organisms.

6. The device as claimed in claim 1, wherein the electrochemically active micro-organisms are selected from cathodophilic micro-organisms which form a cathodophilic, hydrogen-producing microbial culture.

7. The device as claimed in claim 1, wherein the anode or cathode comprising electrochemically active micro-organisms further comprises a plurality of particles of an electrically conductive material which are substantially free of electrochemically active micro-organisms.

8. The device as claimed in claim 1, wherein the bioelectrode particles are in the form of foam particles, powder particles, grains, needles, brush bristles or strips.

9. The device as claimed in claim 1, wherein the bioelectrode particles have an average electrical capacitance of at least 2 $\mu F/cm^2$.

10. The device as claimed in claim 1, wherein the bioelectrode particles have per gram of mass an average specific area of at least 500 $m^2$.

11. The device as claimed in claim 1, wherein the bioelectrode particles are formed by capacitive particles with a number of internal cavities, with electrochemically active micro-organisms on the surface of the internal cavities, and wherein the outer surface of the capacitive particles is in electrical contact with the surface of the internal cavities.

12. The device as claimed in claim 11, wherein the bioelectrode particles are formed by hollow cylinders with electrochemically active micro-organisms on the inner surface of the jacket and wherein the outer surface of the jacket is in electrical contact with the inner surface of the jacket.

13. The device as claimed in claim 1, wherein the anode compartment and cathode compartment are separated by a material allowing passage of protons, while the passage of at least some of the other constituents of the anode fluid and cathode fluid is at least inhibited, such as a material comprising a cation-exchanging part such as a cation-exchanging membrane, or a bipolar membrane or a material comprising an anion-exchanging part such as an anion-exchanging membrane.

14. The device as claimed in claim 1, wherein an electrode compartment comprising bioelectrode particles is subdivided into a number of connected sub-compartments, at least one of which is adapted to perform the electrochemical reaction of the electrochemically active microorganisms, and at least one is adapted for respectively charging and discharging the bioelectrode particles.

15. The device as claimed in claim 14, wherein each sub-compartment is formed by a stirred reactor.

16. The device as claimed in claim 14, wherein the sub-compartments are formed by individual sub-sections of a plug flow reactor.

17. The device as claimed in claim 1, wherein electrical connection between the anode and cathode are activatable and deactivatable.

18. The device as claimed in claim 1, wherein the electrical connection between the anode and cathode comprises a power source, reactants for the electrochemical production of hydrogen are present in the cathode fluid, and a catalyst for the electrochemical production of hydrogen is present on the cathode.

19. The device as claimed in claim 1, adapted to hydrogen production.

20. The device as claimed in claim 1, adapted to generate electrical energy.

21. The device as claimed in claim 1, wherein the electrical connection between the anode and cathode comprises a power source, reactants for methanogenesis are present in the cathode fluid and a catalyst for the electrochemical production of methane is present on the cathode.

22. The device as claimed in claim 1, adapted for methane production.

23. A method for performing an electrochemical reaction, comprising:
(i) providing the device as claimed in claim 1;
(ii) causing movement of the bioelectrode particles relative to the number of charge conductors such that charging or discharging of bioelectrode particles on the number of charge conductors can take place; and
(iii) allowing the electrochemical oxidation reaction in the electrochemical reduction reaction to proceed so that an electric current flows between the cathode and anode.

24. The method as claimed in claim 23, wherein the electric current is further used to perform electric work.

25. The method as claimed in claim 23, for generating electrical energy.

26. The method as claimed in claim 23, for producing hydrogen.

27. The method as claimed in claim 23, for producing methane.

28. A method for performing an electrochemical reaction, comprising:
(i) providing the device as claimed in claim 18;
(ii) causing movement of the bioelectrode particles relative to the number of charge conductors such that charging or discharging of bioelectrode particles on the number of charge conductors can take place; and
(iii) allowing the electrochemical oxidation reaction in the electrochemical reduction reaction to proceed so that an electric current flows between the cathode and anode, wherein the method is for producing hydrogen, wherein the cathode fluid of the device comprises protons, and wherein using the power source a potential is applied to the cathode which is lower than the equilibrium potential of the $H^+/H_2$ redox couple in the cathode fluid, and wherein hydrogen formed at the cathode is discharged.

29. A method for performing an electrochemical reaction, comprising:
(i) providing the device as claimed in claim 21;
(ii) causing movement of the bioelectrode particles relative to the number of charge conductors such that charging or discharging of bioelectrode particles on the number of charge conductors can take place; and
(iii) allowing the electrochemical oxidation reaction in the electrochemical reduction reaction to proceed so that an electric current flows between the cathode and anode, wherein the method is for producing methane, wherein the cathode fluid of the device comprises reactants for methanogenesis, and wherein using the power source a potential is applied to the cathode which is lower than the equilibrium potential of the $CO_2/CH_4$ under the given conditions in the cathode redox couple in the cathode fluid, and wherein formed methane is discharged.

30. The device as claimed in claim 5, wherein the anodophilic micro-organisms are of the genus *Geobacter*, of the genus *Shewanella*, of the genus *Rhodoferax* or a consortium of one or more organisms from this group.

* * * * *